Sept. 20, 1971 S. W. PICCIONE 3,606,118

WEB DRIVING SYSTEM WITH CONTROL CIRCUIT FOR HIGH SPEED SLEWING

Filed Feb. 12, 1970 4 Sheets-Sheet 1

INVENTOR
SEBASTIAN W. PICCIONE

BY Frank J. Vinci Jr.
AGENT

WEB DRIVING SYSTEM WITH CONTROL CIRCUIT FOR HIGH SPEED SLEWING

United States Patent Office 3,606,118

Patented Sept. 20, 1971

3,606,118

WEB DRIVING SYSTEM WITH CONTROL CIRCUIT FOR HIGH SPEED SLEWING

Sebastian W. Piccione, Norristown, Pa., assignor to Sperry Rand Corporation, New York, N.Y.

Filed Feb. 12, 1970, Ser. No. 14,814

Int. Cl. G11b *19/26*

U.S. Cl. 226—9 14 Claims

ABSTRACT OF THE DISCLOSURE

A control circuit for a high speed web driving system includes a plural stage shift register for receiving groups of coded vertical format signals, and a first decoder for decoding each group of coded signals stored in the register and for determining presence of a stop code in the register, to cause generation of a control signal for advancement of web speed from low speed slew to high speed slew when no stop code is in the register. A second decoder decodes the coded group at a predetermined stage of the register to determine presence of a stop code a predetermined number of lines from the stop position on the web, and effects deceleration of the web from high speed slew to low speed slew upon decoding of a stop code thereat.

BACKGROUND OF THE INVENTION

The present invention is directed to a web driving system and more particularly relates to a high speed web driving system having a control system for automatically determining whether or not the web should be advanced at high speed.

Data processing systems which utilize high speed printers for printout of computer processed information generally provide a high speed paper advance or feeding system for the high speed printer. In the printout of computer processed information, paper advancement may occur by either an incremental or "stepping" motion in which the web is advanced a line at a time, or by a continuous or "slewing" motion in which the web is advanced several lines at a time. If the web is advanced in the "slewing" mode, and at high speeds, the drive system requires "pre-knowledge" or "look-ahead" of the number of lines of web which are to be advanced or spaced. This is so because the rate of advancement of high speed driving systems is such as to require more than one line to decelerate from the high slew speed to zero speed. Hence the decision to advance the web at a high slew speed is based on the number of lines which are to be advanced, since accelerating to high speed slew without having a sufficient number of lines to space will result in overshooting the desired stop position.

In a data processing system in which the number of lines to be spaced or advanced is always given directly by the controlling instruction (ex. space one line, space five, ten, etc.) the decision on wether or not to advance the web at a high slew speed can easily be made, since it only involves a comparison of the number of lines to be spaced with the number of lines needed to correctly accomplish a high speed slew. Since the latter number is a constant predetermined value, if the number of lines to be spaced or advanced is greater than the number of lines needed to slew at a high speed, then the web driving system will be set in the high speed slew mode. If not, then the system will not be set in the high speed slew mode.

However, in many systems, the number of lines to be spaced or advanced is not given directly by instruction. By way of example, in systems which utilize a vertical format unit such as a "forms loop" read by a photoelectric or other type of reader, the number of lines to be spaced is not necessarily known since the web driving system is just given the command to advance to a coded position on the forms loop. This position can be any number of lines away, from one to the total number of lines on a form.

Previously, high speed paper advance systems have utilized two spaced apart read stations at the vertical format unit assembly, one of which is a normal read and the other of which is a "pre-read" station, the latter of which provides look-ahead information. In addition, special instructions and procedures to the person making a forms loop tape, such as special holes punched in the forms loop for high speed control, are often required with prior art systems. Therefore, it is one object of this invention to provide a web driving system which requires only a single read station, and no special holes, punches, or instructions by or for the person making the forms loop tape; it is a further object of this invention to provide a web driving system which will automatically determine whether the web should be slewed at high speeds or not.

SUMMARY OF THE INVENTION

Briefly stated, in accordance with one aspect of my invention, in a web driving system having means including a driving member for advancing the web at a first speed and at a second higher speed, a novel control circuit is provided, comprising storage means having a plurality of storage stages, and input means for receiving groups of coded signals, each stage being adapted to store a group of said signals; means for shifting said groups of coded signals through said storage stages; decoding means having an input coupled to each of said storage stages for decoding each group of coded signals stored therein, and for generating a control signal in response to absence of a predetermined coded group signifying the stopping of said web, and circuit means connected to said drive means for causing advancement of said web at said second higher speed upon receipt of said control signal. According to this and other novel aspects of my invention, only one read station is required at the vertical format unit assembly, no special instructions or procedures are required, and look-ahead or pre-knowledge is automatically obtained.

THE DRAWINGS

Other advantages and features of my invention will become further apparent in the following description, and with reference to the accompanying drawings, in which like reference numerals identify like components, and in which.

DETAILED DESCRIPTION OF THE INVENTION

Figure 1:
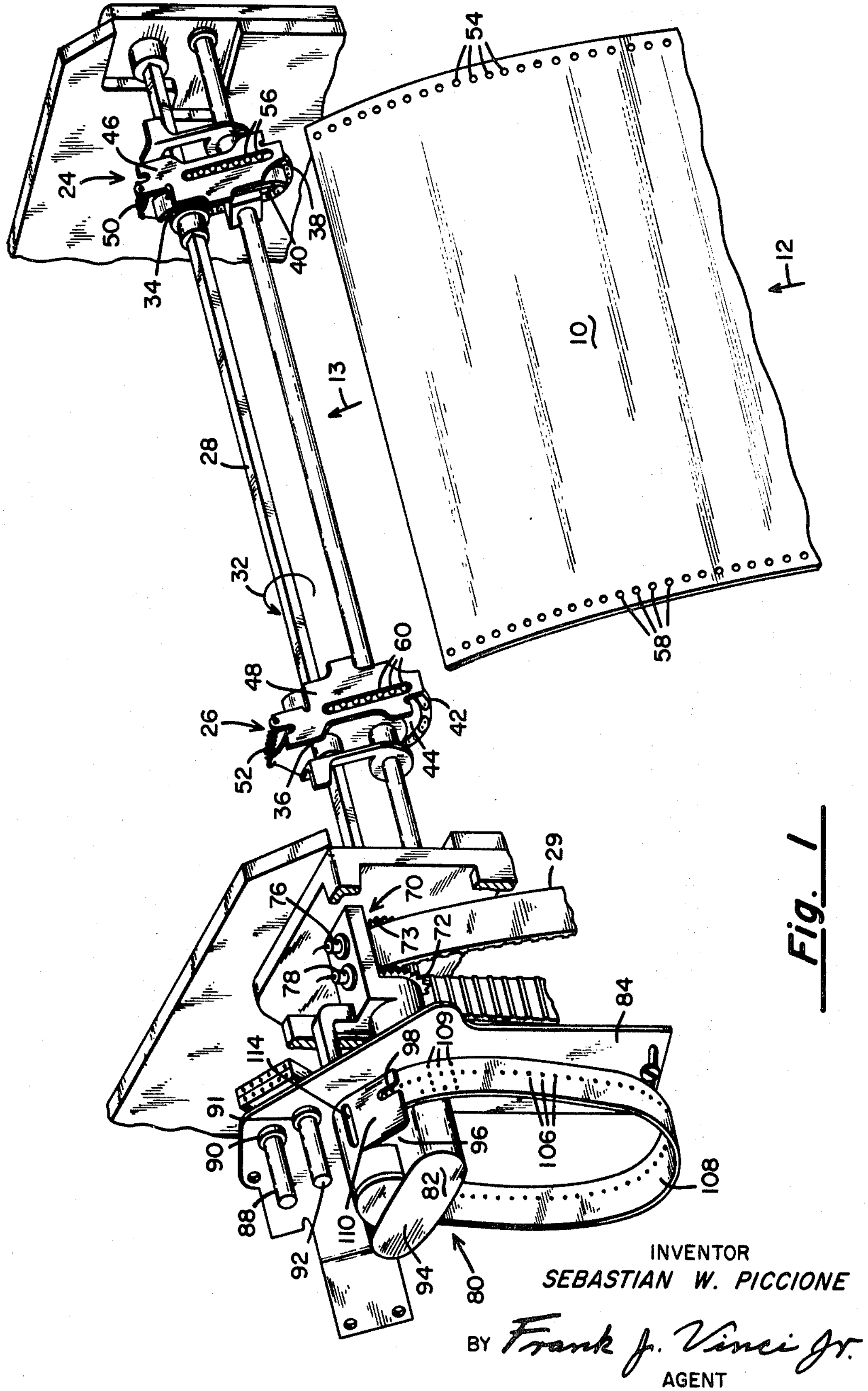
FIG. 1 is a perspective drawing, illustrating typical mechanical components of a web driving system, and a forms loop assembly.

Referring to FIG. 1, there is shown a web driving system for advancing the web 10 along a path indicated by the arrows 12 and 13. Web 10 may be advanced from a front paper bin station (not shown) containing a supply of web 10 in the form of fanfold paper, a paper roll, etc., and may be drawn upwardly in the direction of arrows 12 and 13 past a print station, and then passed toward a rear paper bin assembly (not shown) where the printed web is stored.

Figure 2:
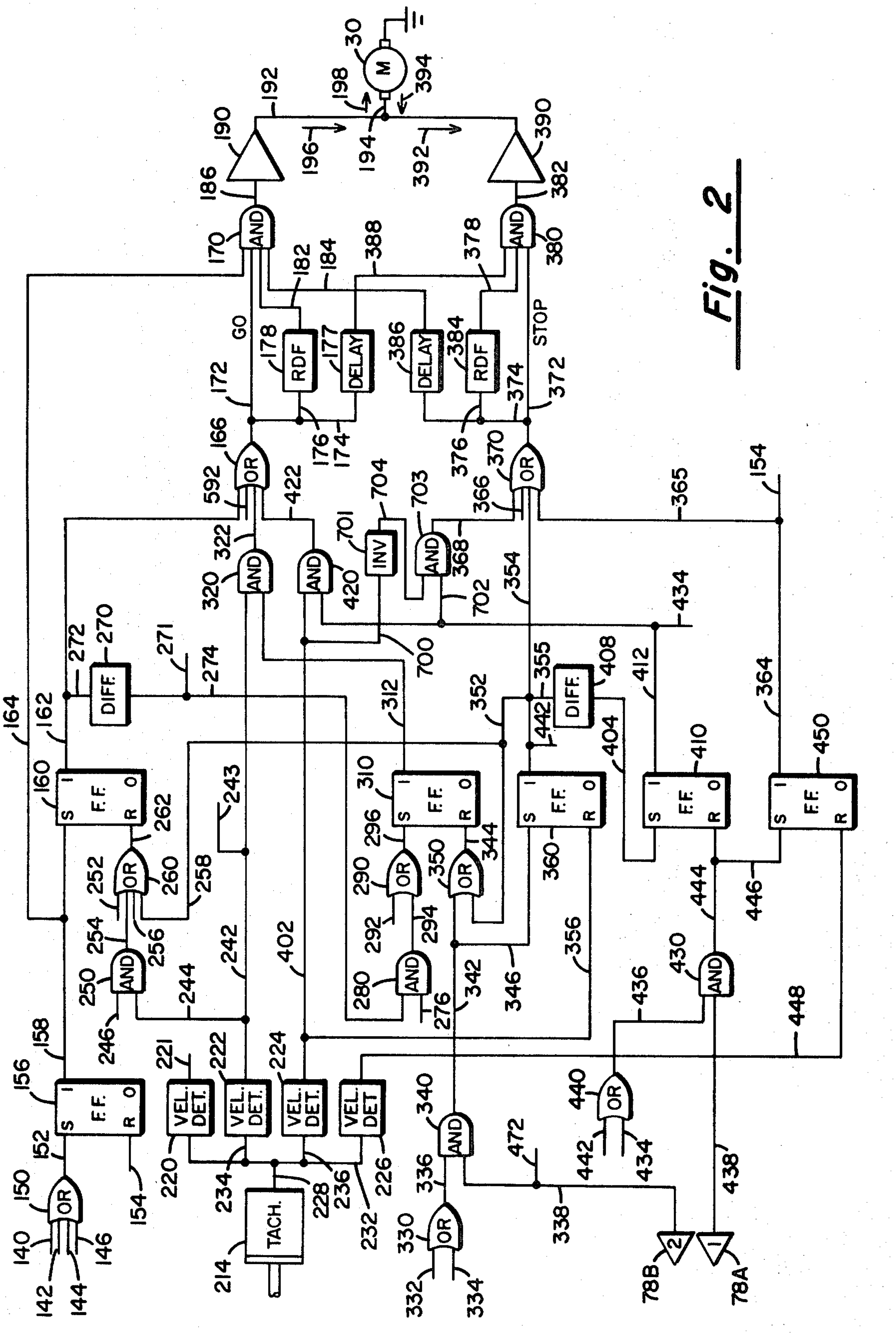
FIG. 2 is a schematic drawing of a circuit used to cause advancement of the FIG. 1 web at a standard first speed and at a second higher speed.

The drive means for advancing web 10 may include a pair of drive members or tractor assemblies 24 and 26 coupled through a drive shaft 28 to a motor assembly 30, which is shown diagrammatically in FIG. 2. Energization of motor 30 results in rotation of shaft 28 through belt 29 in the direction indicated by arrow 32. Shaft 28 is coupled to drive sprocket wheel 34 of tractor 24, and to drive sprocket wheel 36 of tractor 26. Right side tractor 24 has an endless conveyor or chain 38 coupled about drive sprocket wheel 34 and a driven sprocket wheel 40, and left side tractor 26 has an endless conveyor or chain 42 coupled about drive sprocket wheel 36 and a driven sprocket wheel 44. Each tractor has a pressure plate (46 and 48 respectively) which is movable about respective pressure plate springs 50 and 52 to allow right side marginal apertures 54 in web 10 to mate with teeth 56 on conveyor 38, and to allow left side marginal apertures 58 in web 10 to mate with teeth 60 on conveyor 42. Each pressure plate 46 and 48 is moved away from its respective tractor assembly to allow web 10 to be threaded through the machine, and upon return of plates 46 and 48, the web 10 is securely held in position for advancement through the printer.

Also depicted in FIG. 1 is a timing unit generally depicted by the numeral 70. Timing unit 70 may include a pair of starwheels 72 and 73 coupled to shaft 28 for rotation, and a first sensing means 76 disposed adjacent the periphery of starwheel 73 and useful at a first line spacing, and a second sensing means 78 disposed adjacent the periphery of starwheel 72 and useful at a second line spacing. Each of the sensing units 76 and 78 may consist of an individual reluctance head pickup to generate an appropriate voltage timing signal for the web driving circuitry upon sensing of the movement of the web 10 by a given line spacing. Each reluctance head pickup may be a magnet operative to generate an appropriate voltage signal upon sensing the passage of each tooth on respective starwheels 72 and 73. Sensing means 76 may include a pair of reluctance heads (not shown) operative at a first line spacing, one head being used at a low velocity to get to stop position, and the other head being used at a high velocity to get to the low velocity. Likewise sensing means 78 may include a pair of reluctance heads 78A and 78B (shown in FIG. 2) operative (through a switch) at a second line spacing, one head being used at a low velocity to get to stop position, and the other head being used at a high velocity to get to the low velocity. Each reluctance head for a sensing means may be positioned near a respective starwheel periphery at a different angular spacing between the head and teeth for proper phasing. The precise manner in which a pair of reluctance heads are operatively associated with the web driving circuitry to provide line spacing information and position feedback will be described hereinafter.

FIG. 1 also shows a vertical format unit or form loop control generally depicted by the numeral 80. Form loop control 80 includes a tape reader 82 mounted on a form loop control plate 84 which is in turn connected to one side of the printer. Tape reader 82 may be of the photoelectric class of tape readers and may include a light source 88 and lens 92 secured by respective clamps 90 and 91 to plate 84. Tape reader 82 may also have an array of photosensitive detectors arranged within a read head 94, and a loop guide bracket 96 disposed intermediate light source 88 and read head 94. A sprocket wheel drive 98 is located within a cutout in the curved portion of bracket 96 and at the lower apertured portion of clamping member 110, and has a plurality of sprocket teeth for conventionally engaging sprocket holes 106 in the forms loop tape 108. The form loop spring or clamping member 110 is movable about a fixed pivot for insertion to forms loop tape 108 intermediate the loop spring and sprocket wheel 98 with sprocket holes 106 in mating engagement with the sprocket teeth. Forms loop tape 108 is passed over bracket 96 intermediate light source 88 and the read head 94 to form the tape loop shown in FIG. 1. Clamping member 110 contains an apertured portion 114 to allow the light from source 88 to span the tape, and bracket 96 also contains an apertured portion (not shown) to allow the light which passes through the apertures or coded perforations in tape 108 to strike the photosensitive detectors of read head 94.

Vertical format unit or forms loop control 80 is a paper feed program unit which is operable to control the format of vertical spacing of printed information on web 10. Forms loop tape 108 is an endless or continuous belt which includes a series of coded perforations 109 located thereon. The coded perforations, which are arranged in coded groups along rows of tape 108, bear a certain relationship to the position of web 10 at the print station, and control the number of lines skipped or slewed during web advancement by the printer. It should be mentioned that the number of lines skipped or slewed can be either determined joint by the vertical format unit 80 and the processor, or solely by the pattern of coded perforations on forms loop tape 108. To achieve format control by the latter method, sprocket wheel 98 may be coupled to the tractor assemblies 24 and 26 through the drive sprocket wheels 34 and 36 so that sprocket wheel 98 is concurrently advanced with the tractors. This may be achieved in a well known manner through conventional coupling consisting of pulleys, gears, etc. (not shown herein). The tractor assemblies 24 and 26 advance web 10 upon receipt of an input command signal signifying a start paper or advance condition. The input command signal may originate in a buffer of the printer electronics, and represents the completion of a line of printing. Once web advancement is started, the web will continue to move until a stop signal is received. The stop signal originates on forms loop tape 108 in the form of a predetermined perforated stop code which, by its location on the tape, determines whether the web is to be advanced one line, or slewed for two or more lines.

Having described the drive assembly, timing unit, and vertical format unit, I will now describe the circuit means utilized to effect web slewing. Referring to FIG. 2, the above-mentioned input command signal, which signifies that web 10 is to be advanced, is received over either of the input conductors 140, 142 or 144. An input command signal over conductor 140 may signify advancement of the web by one line, a signal over conductor 142 may signify advancement of web 10 by two lines, and a signal over conductor 144 may represent advancement of web 10 by three lines. Also, a paper feed command may be received over input conductor 146 from the processor whenever an indeterminate line step is required under forms loop control. Since each of the conductors 140, 142, 144 and 146 is coupled to a separate input of OR gate 150, receipt of an input command or paper feed command signal over any one conductor operates to provide a high level output from OR gate 150 over conductor 152. Conductor 152 is in turn connected to the set input of feed flip-flop 156, which is set when a high level output is generated over conductor 152. As feed flip-flop 156 is set, a high level signal appears over conductor 158, and flip-flop 160 is also set. A conductor 162, connected to the set output of flip-flop 160, is also connected to one input of OR gate 166, and conductor 158 is connected through conductor 164 to one input of AND gate 170. Hence, when flip-flop 160 is set, the high level signal over conductor 162 provides a high level output from OR gate 166 over output conductor 172 simultaneously with a high level signal over conductor 164. At the same time, the output over conductor 172 is coupled by means of conductors 174 and 176 to the input of retriggerable delay flip-flop (RDF) 178. RDF 178, and also RDF 384 prevent GO or STOP currents from remaining on continuously for more than a predetermined time, and each operates in a well known manner to provide a high level output signal for a predetermined time after receipt of a high level input signal, to thereby condition respective AND gates 170 and 380. The output from RDF 178 is connected over conductor 182 to another input of AND gate 170. At the same time that simultaneous high level signals appear over input conductors 164, 172 and 182, a high level signal is generated over conductor 184 (in a manner to be explained hereinafter) which is connected to another input to AND gate 170. Hence, at such time, since all inputs to AND gate 170 are at a high signal level, a continuous level high output signal will be generated over output conductor 186 in a well known manner. The signal over conductor 186 is applied to an input of power driver amplifier 190 which amplifies the inptu signal level and effects production of an output GO current to motor 30 over conductors 192 and 194 in the direction indicated by the arrows 196 and 198.

The motor 30 may be a fast response direct current (D-C) motor which can be made to accelerate by driving current in one direction through the motor armature, and which can be made to decelerate by driving current in an opposite direction through the motor armature. The appropriate control circuits of this invention control the currents to the motor in order to produce accelerations, decelerations and constant velocities at the proper times to generate the velocity waveforms shown in FIGS. 4A to 4D. The output GO current provided over the conductors 192 and 194 causes motor acceleration which is graphically depicted by the portion of the velocity waveform marked 1 in FIG. 4A.

When the acceleration effected by the above-mentioned GO current causes web 10 to reach a first given speed, which I shall call standard skip or slew speed, an output control signal or velocity feedback signal is generated over output conductor 242 from the velocity feedback or detector circuit. The velocity feedback circuit is utilized to control the currents to the motor 30. It may include a tachometer 214 coupled to the driving shaft of motor 30 and driven thereby to sense the velocity of the drive, and a plurality of velocity detectors 220, 222, 224, and 226, intercoupled to the tachometer output 228 over a plurality of respective input conductors 232, 234, and 236. Each velocity detector circuit is operative to provide a low level output (velocity control) signal which causes motor deceleration when the motor speed is above a predetermined speed, and to provide a high level velocity control signal to cause motor acceleration when the motor speed is below the predetermined speed, which predetermined speed may be different for each velocity detector. Thus, by way of example, when motor 30 has accelerated to a speed sufficient to advance web 10 to a first given speed, or standard skip speed, velocity detector circuit 222 is operative to provide a low level output signal over conductor 242. The output signal over conductor 242 is coupled to one input of AND gate 250 by means of conductor 244. With a low level signal provided over conductor 246, indicating that the web driving system is to be advanced at the standard skip or slew speed, and not at the high skip or slew speed (in a manner to be indicated hereinafter), the low signal level over conductor 244 is operative to provide a high level output signal over output conductor 254 from AND gate 250 (AND gate 250 thus also performs an inversion). This signal is operative to provide an output signal (of a high level) over conductor 262 of OR gate 260. This high level signal over conductor 262 is operative to reset flip-flop 160, which resetting in turn is sensed by a differentiator circuit 270 by detection of the decrease in the signal level over conductor 272 by way of conductor

162. Differentiator 270 responds to such a decrease by providing a low level output signal over conductor 274 which is applied to one input of AND gate 280. When the web driving system is in standard skip or slew, this signal over conductor 274 combines with a like low level signal over conductor 276 (generated in a manner to be indicated hereinafter) to activate AND gate 280 and provide a high level output signal over conductor 294 (AND gate 280 also provides inversion). Conductor 294 is connected to one input of OR gate 290, and thus a high level input to any input of OR gate 290 effects generation of a high level output over conductor 296, which in turn is operative to set flip-flop 310. When flip-flop 310 is set, a high level signal will be applied over conductor 312 to one input of AND gate 320. The signal over conductor 312 combines with velocity detector 222 to provide a GO signal over output conductor 172 of OR gate 166 whenever velocity detector 222 signifies (over conductor 242) that the web velocity is below standard skip or slew speed. This may be effectuated by velocity detector 222 providing a high level signal when web speed is below standard skip speed and a low level signal when web speed is above standard speed, and by providing a low level signal over conductor 246 when the system is in standard skip speed, and a high level signal over conductor 312 when flip-flop 310 is set. The GO signal over conductor 172 will cause GO current to be supplied to motor 30 (in the direction of arrows 196 and 198 in the same manner as hereinbefore described i.e., through AND gate 170 and power driver amplifier 190 and conductors 192 and 194) causing the web 10 to accelerate slightly above standard skip speed. Such an increase will again be detected by velocity detector 222 and will cause GO current to be removed from motor 30 by a low level signal over conductor 242, and a low level signal from AND gate 320 over conductor 322 together with a low level signal from flip-flop 160 over conductor 162 due to the resetting of said flip-flop through OR gate 260. Again the motor 30 will decelerate until the web speed again goes below standard skip speed. Hence, the action of velocity detector 222 and the associated circuitry causes GO current to be discontinuously supplied to the motor 30, with the net result being that the velocity of web 10 will average at the standard skip speed, as is depicted on the waveform of FIG. 4A by the reference numeral 4.

Flip-flop 310 will remain set until the desired number of lines have been fed, at which time it will be reset in the following manner. A pair of input conductors 332 and 334 are coupled to individual inputs to OR gate 330. The input signal over conductor 332 may be provided from timing unit (not shown) which counts the starwheel 72 movement and compares the number of lines advanced with a controlling instruction, and generates a high level signal over conductor 332 upon equal comparison. The high level input signal over conductor 334 is applied when a forms loop tape is used, and is generated by the control circuit of FIG. 3 (in a manner to be described hereinafter) when a stop code is decoded at the corresponding position on the web where the web is to be stopped. A high level signal over either of conductors 332 or 334 causes OR gate 330 to generate a high level output signal over conductor 336 which is connected to one input of AND gate 340. Another input to AND gate 340 is applied over conductor 338 from the output of reluctance pickup 78B, which provides a high level signal each time the web 10 has been advanced one line. The coincidence of high level input signals to AND gate 340 effects a high level output over conductor 342, which is coupled to one input of OR gate 350. Such a high level input provides a high level signal over conductor 344, which is applied to the reset input of flip-flop 310, to thereby reset flip-flop 310.

At the same time that flip-flop 310 is reset, flip-flop 360 is set by a high level signal applied to the set input of flip-flop 360 over a conductor 346, which is coupled to conductor 342. When the flip-flop 360 is set, a high level signal over conductor 354 is applied to one input of OR gate 370, which in turn effects a high level stop signal over conductor 372. Concurrently therewith a high level signal is applied over conductor 378 as hereinbefore mentioned, and a high level signal over conductor 388 is generated (in a manner to be indicated hereinafter) and applied to individual inputs of AND gate 380, and a high level output signal appears over conductor 382. This latter signal is applied to power driver amplifier 390 and causes the stop current to be delivered to the motor 30 by drawing current from motor 30 over conductors 192 and 194 in the direction indicated by the arrows 392 and 394. The stop current causes a deceleration of the web 10 speed, which deceleration is indicated in FIG. 4A by the reference numeral 5.

The motor 30 and the web 10 will both decelerate until the web 10 speed reaches a speed which is sensed by velocity detector circuit 224. At this speed, which is lower than the standard skip speed, velocity detector circuit 224 is operative to provide a high level output signal over conductor 356 by way of conductor 402. A signal over conductor 356 is applied to the reset input of flip-flop 360, and is operative to reset flip-flop 360. The resetting of flip-flop 360 causes generation of a differentiator pulse over conductor 404, which pulse is caused by the interconnection of conductors 354 and 355 to an input of differentiator circuit 408. The output pulse over conductor 404 is applied to the set input of flip-flop 410, and effects a high level output signal over output conductor 412 of flip-flop 410. Conductor 412 is applied to one input of AND gate 420, and the high level output velocity detector 224 is applied to the other input of AND gate 420 by means of the conductor 402. The set pulse from flip-flop 410 over conductor 412 and the high level signal produced by velocity detector 224 effect a high level signal over output conductor 422 from AND gate 420, and the output over conductor 422 is applied to one input of OR gate 166. The signal over conductor 422 causes a high level output over conductor 172, which in turn causes GO current to be delivered to motor 30 through AND gate 170, conductor 186, power driver amplifier 190, and conductors 192 and 194. The GO current is applied in the direction indicated by the arrows 198 and 196, and is affected in the same manner as previously indicated. Velocity detector circuit 224 is operative in a manner similar to that of the velocity detector circuit 222. That is, GO current will be supplied to motor 30 through velocity detector circuit 222, AND gate 420, OR gate 166, etc., in the same manner in which velocity detector circuit 222 is operative, which is, to sense the speed of the web 10, and to alternately apply high level and low level signals over conductor 402, depending on whether the speed of the web 10 is respectively below or above the predetermined setting of velocity detector circuit 224. While a high level output from velocity detector 224 causes generation of a GO current, when a low level signal is applied by velocity detector 224 over conductor 402 during the time that flip-flop 410 is set, stop current is drawn from the motor in the following manner. The low level signal over conductor 402 is inverted by inverter 701 due to interconnecting conductor 700. Then, the high level signal over output conductor 704 and the high level output from flip-flop 410 (over conductor 702) are applied to AND gate 703. Upon coincidence of the two high level input signals to AND gate 703, a high level output signal is applied over conductor 368 to OR gate 370, causing STOP current to be drawn from motor 30 in the manner hereinbefore described. Thus, GO current is alternately applied to and removed from the motor 30 to cause the web 10 velocity to have an average speed which is below the standard skip speed, and which is depicted in FIG. 4A by the reference numeral 6.

The web 10 and motor 30 will continue in this fashion until flip-flop 410 is reset by a high level signal applied over conductor 444 in the following manner. The output from reluctance pickup 78A is applied over conductor 438 to one input of AND gate 430. Another input to AND gate 430 is received over conductor 436 from the output of OR gate 440. The inputs to OR gate 440 are received over conductor 442 from the set output of flip-flop 360, and over conductor 434 from the set output of flip-flop 410. A high level output over conductor 444 is generated by the first pulse from reluctance pickup 78A after setting of either flip-flop 360 or flip-flop 410. The AND gate 430 output signal over conductor 444 is operative to reset flip-flop 410, and is further operative to set flip-flop 450 by means of an interconnecting conductor 446 which is coupled to conductor 444 and to the set input of flip-flop 450. As flip-flop 410 is reset, the signal over conductor 412 decreases to a low level, and GO current ceases to be provided to the motor 30. Concurrently therewith, the setting of flip-flop 450 effects a high level output signal over conductor 364 which is applied to one input of OR gate 370 through conductor 365. This signal to OR gate 370 causes a high level output stop signal over conductor 372, which is coupled to one input of AND gate 380. The input signals to AND gate 380 over conductors 372, 378, and 388 cause a high level output from AND gate 380 over the output conductor 382. Output conductor 382 is coupled to an input of power driver amplifier 390, and causes stop current to be delivered to the motor by drawing current over conductors 194 and 192 in the direction indicated by the arrows 392 and 394. The stop current so provided to the motor is applied and causes the motor and the web to decelerate until the web velocity is at zero, which condition is detected by velocity detector circuit 226. Velocity detector circuit 226 is operative upon such sensing to provide a high level signal over conductor 448 when the web 10 speed goes to zero, which resets flip-flop 450, and effects a corresponding low level output over conductor 364. The resetting of flip-flop 450 in this manner ends the stop current provided through OR gate 370, gate 380, and the power driver amplifier 390, and terminates the line feed for the web driving system. In addition, when flip-flop 450 is set, feed flip-flop 156 is reset over conductor 154 which is interconnected between the set output of flip-flop 450 and the reset input of flip-flop 156. This is done since when when flip-flop 450 is set, the web is going from low speed to stop and then the drive cycle is ended and the feed flip-flop 156 must be reset for the next cycle. Resetting feed flip-flop 156 also insures that no GO current will be supplied to motor 30 because AND gate 170 is inhibited by a suitable signal level applied over conductor 164.

Figure 4A:
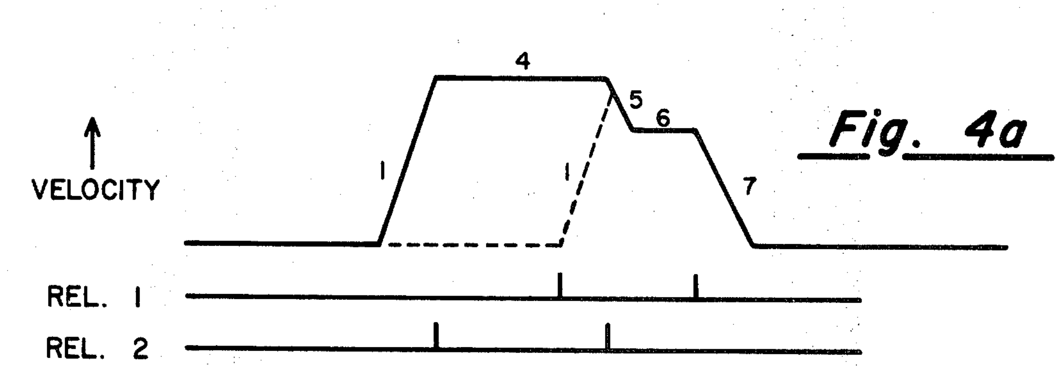
FIGS. 4A through 4D are schematic representations of velocity waveforms for standard slewing at a first speed and high speed slewing at a second speed, which are useful in explaining the operation of my invention.
Figure 4B:
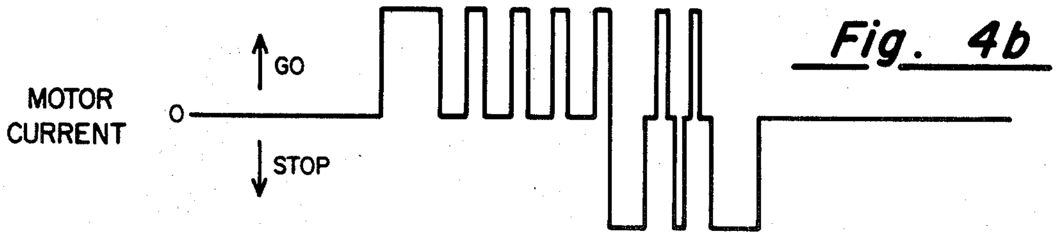

A deceleration of the motor and the corresponding deceleration of web 10 are graphically depicted in FIG. 4A by the reference numeral 7. The effect of the circuitry shown in FIG. 2 may also be seen by reference to FIG. 4B, which shows blocks of motor current corresponding to the GO currents and stop currents produced by the power drivers. It can be seen that the GO current produced to accelerate the web at reference numeral 1 is continuous until the web reaches the velocity detected by velocity detector circuit 222. GO currents provided during the interval depicted by reference numeral 4 are discontinuous. The stop current provided during the interval 5 is continuous, the GO and stop currents provided during the reference period 6 are alternative, and the stop current provided during the reference interval 7 is continuous until the web velocity detector circuit 226 detects the speed of the web to be zero.

Figures 3, 5:
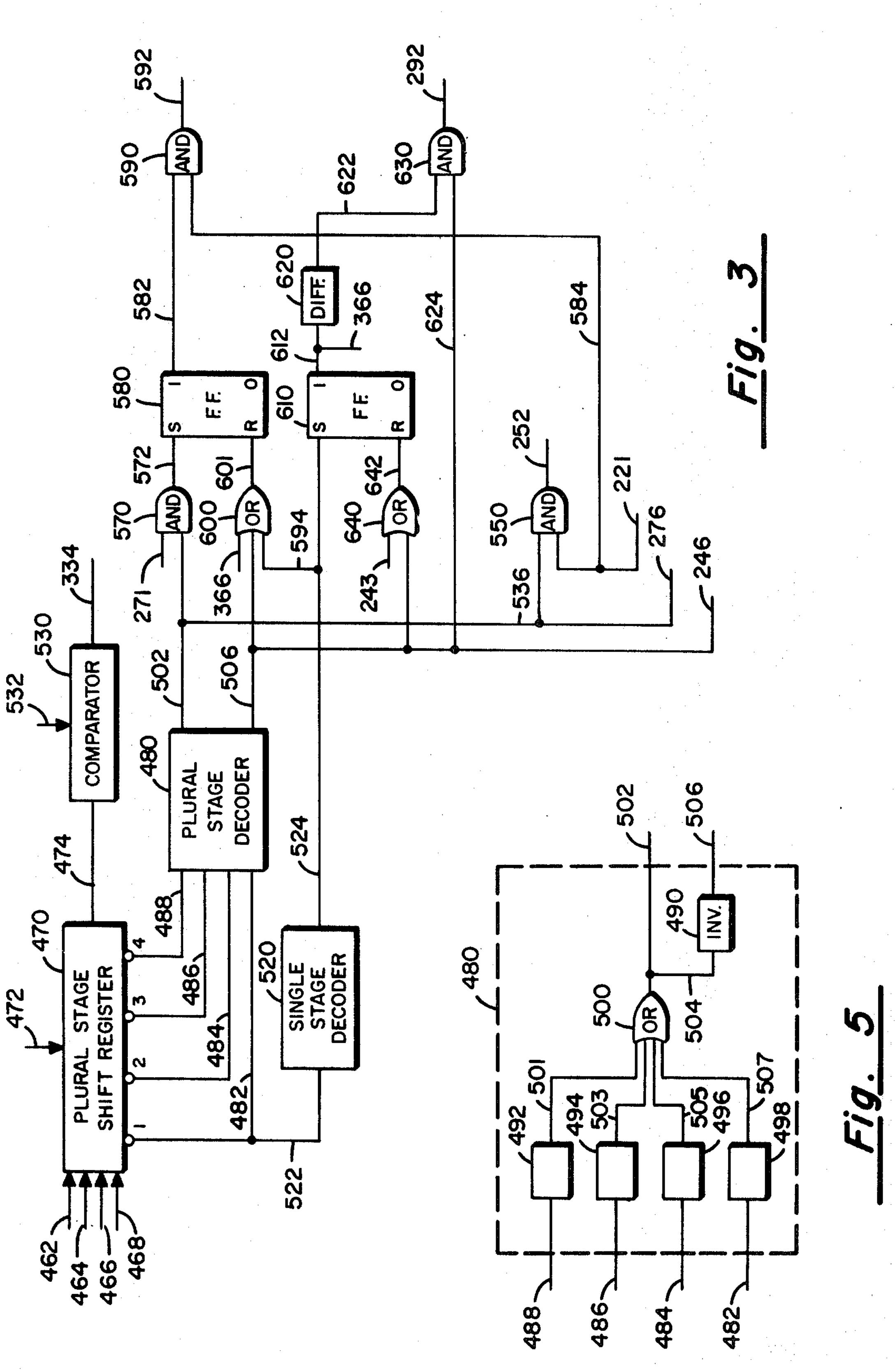
FIG. 3 is a schematic drawing of one form of control circuit provided by the invention.
FIG. 5 is a more detailed schematic drawing of the first decoding means generally shown in FIG. 3.

Having thus described one system for advancing the web 10 at a first speed or standard skip speed, I will now describe a salient aspect of my invention, by referring to FIG. 3 in particular, which shows a novel circuit for automatically determining whether the web driving system is to be utilized at the standard skip speed or at a high skip speed. The control circuitry of FIG. 3 is particularly efficacious when utilized with a web driving system which is not capable of decelerating from high speed slew to zero velocity in the space of one line. Furthermore with a web driving system that utilizes the vertical format control such as the forms loop unit shown in FIG. 1, the number of lines to be spaced or skipped is not necessarily known, since the web driving system is merely given a command to advance to a coded position on forms loop tape 108. This position may be any number of lines away, from one line to the total of lines on a form. The control system shown in FIG. 3 provides a system for efficiently obtaining the pre-knowledge (of the number of lines to be spaced) needed by a high speed slew system. According to a salient feature of this control system, the outputs from the tape reader photosensitive detectors within read head 94 are applied over input conductors 462, 464, 466 and 468 to an input of a storage means or a plural stage stage register 470. The input conductors to shift register 470 receive each group of coded signals from forms loop tape 108 in a parallel bit by bit manner, one bit per conductor. Shift register 470 includes a plurality of storage stages having terminals identified in FIG. 3 by the numerals 1, 2, 3, and 4. Each storage stage of the register is adapted to store one group of coded signals, and the number bits per stage is equal to the number of data channels of the paper loop tape 108 (which is four for the specific form shown herein). An input conductor 472 which is coupled to the output of reluctance pickup 78B over conductor 338, is connected to the register 470 over a shift input, and is operative to provide timing signals for shifting each group of coded signals through the respective storage stages of the register. As one line of the paper tape code is read into stage one of the shift register, the previous line's code is shifted from stage one to stage two. Likewise stage two's information is shifted to stage three, and shift register 470. The input conductors to shift register fore, at any one time the shift register will be storing four lines of forms loop paper control information, and a look-ahead at this information is therefore possible. The number of storage stages in shift register 470 should be at least equal to the number of lines (N) required by the high speed slew system to decelerate from the second higher speed to zero speed, although the storage may in fact comprise more than the number of lines required to decelerate to zero (i.e., more than N stages). After the movement of four or more lines of information from the paper tape 108, the shift register will store the contents of four consecutive lines of forms loop information. This information is now available for examination by the high speed slew logic which can now determine if the next stop code is more than four (4) lines away (i.e., no stop code in the register), and therefore can determine whether or not standard speed slew or high speed slew is to be utilized.

The outputs from each storage stage of shift register 470 may be applied to individual inputs of a plural stage decoder 480. Decoder 480, which is more clearly depicted in FIG. 5, may include individual decoder stages 492, 494, 496, and 498, each of which is operable to issue a high level output only upon sensing a single predetermined input coded group which is the stop code. An individual output from each storage stage of shift register 470 is coupled to an individual input of a decoding stage of decoder 480, the stage 1 output of shift register 470 being coupled to the input of decoding stage 498 by way of conductor 482, the stage 2 output being coupled to the input of decoder stage 496 by way of conductor 484, and the stage 3 and 4 outputs being connected to the respective inputs of decoder stages 494 and 492 by way of respective conductors 486 and 488. Each decoding stage decodes the forms loop signal stored in the respective storage stage to determine whether or not the predetermined stop code is present. The outputs from each decoder are coupled by means of individual conductors 501, 503, 505 and 507 to an individual input of OR gate 500. Hence if a predetermined coded group signifying a stop code is present in any one of the storage stages of shift register 470, a high level signal will appear over one of the input conductors to OR gate 500, and will cause a corresponding high level output control signal over conductors 502 and 276. A high level control signal over conductors 502 and 276 signifies that the web 10 is to be stopped within one of the four lines of coded signals within shift register 470. A low level control signal over conductors 502 and 276 signifies the absence of a stop code in the storage stages of the shift register 470, and thus can be utilized to effect a high speed slew at the second higher speed of the web driving system. Additionally, since the output of OR gate 500 is inverted by inverter 490 (by way of conductor 504) the inverter output over conductors 506 and 246 may also be used as a low level control signal signifying that the web 10 is to be halted within the next four lines, and a high level control signal over conductors 506 and 246 signifies the absence of a stop code within register 470 and can be used to effect high speed slew at the second higher speed.

The control circuit shown in FIG. 3 may also include a single stage decoder 520 having an input coupled to the first storage stage output of shift register of 470 by means of a conductor 522. Single stage decoder 520 receives the coded group of signals within the first stage of shift register 470 to determine whether or not the first stage of register 470 contains the predetermined stop code. Decoder 520 will generate a high level control signal over output conductor 524 upon sensing a stop code, and this control signal signifies that N (here equal to four) lines of web feeding remain before the web is to be halted. Hence the control signal over conductor 524 signifies that, if the web driving system is in the second or high speed slew mode, it should decelerate to the low or (first) standard speed to insure that the web has sufficient time (i.e., four lines) to stop. The output over conductor 524 is applied to the remainder of the web driving system to implement the function.

Since the web driving system requires N lines to stop when in high speed slew, decoder 520 must be coupled to a predetermined storage stage at least $N-1$ stages ahead of the last storage stage of register 470. This is so because the last storage stage contains the next line of format information and has not yet been shifted out of the register. Hence, for a five (5) stage register and a web driving system requiring 4 lines to stop, decoder 520 can be coupled to the second stage and still be $N-1$ stages ahead of stage 5. Of course, the decoder 520 may in that case also be coupled to stage 1. However this would deprive the system of an extra line of high speed slew.

Also shown in FIG. 3 is a comparator 530, which has a first input coupled over conductor 474 to the output of plural stage shift register 470. Comparator 530 also has a second input connected to receive a signal over input conductor 532. The signal applied over conductor 532 will be a repetitive signal generated by conventional means (not shown) signifying the information corresponding to stop code signal on paper tape 108. Comparator 530 is thus operative to compare the stop code signal with the signal being shifted out of the last storage stage of shift register 470. Upon equal comparison, a high level output control signal is generated over output conductor 334, which signifies that the code being shifted out of fourth stage of shift register 470 matches the paper loop code (i.e., stop code) that is being implemented. If it does, it then indicates that the web has arrived at its desired position at the print station and that therefore the web should be stopped.

The various control signals generated at the outputs of circuits 530, 520, and 480 may be utilized to implement both the first or standard speed or the second (higher) speed slew condition. This may be done in the following manner, by reference to both FIGS. 2 and 3. The output over conductor 502 may be coupled by means of conductor 536 to one input of AND gate 550. Another input to AND gate 550 over conductor 221 may be derived from velocity detector circuit 220. If no stop code is contained within shift register 470, high speed slew may be effected, since a low level control signal will appear over conductor 502 and a high level control signal will be generated over conductor 506. Hence, flip-flop 160 will not be reset by the output signal from velocity detector 222, since the input to AND gate 250 over conductor 246 will be at a high level because of the coupling of conductor 246 to conductor 506. Instead, flip-flop 160 will remain set until a low level velocity feedback control signal is generated by velocity detector 220 when the web 10 speed reaches the maximum speed of high speed slew. The output of velocity detector 220 is applied to one input of AND gate 550 by way of conductor 221, and the other input to AND gate 550 is derived from conductor 502 by way of conductor 536. Since conductor 502 (and hence conductor 536) is at a low level during high speed slew, the detection of maximum speed causes coincidence of the two low level inputs to AND gate 550, and a high level output signal is generated over output conductor 252 (due to inversion by gate 550), which signal is applied to an input of OR gate 260 to reset flip-flop 160.

Figure 4C:
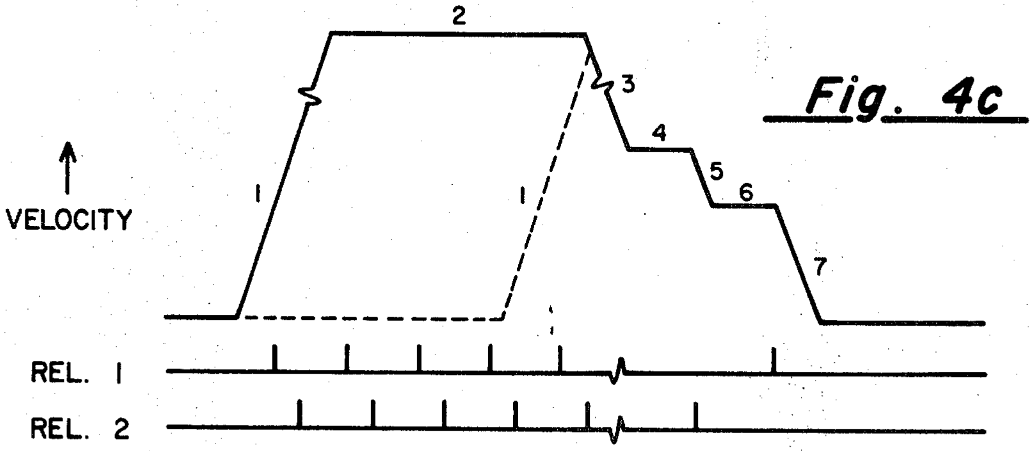
Figure 4D:
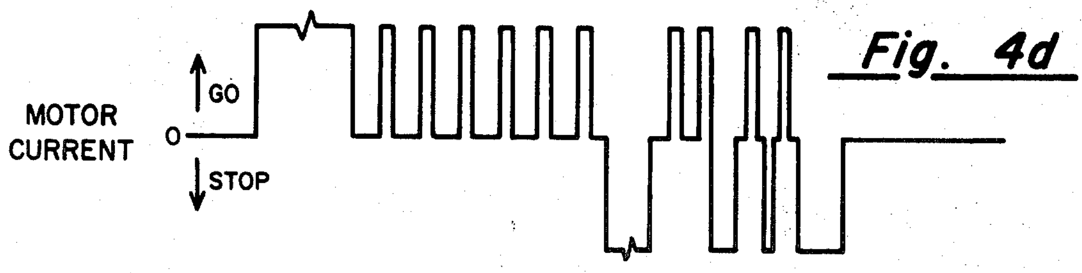

Before flip-flop 160 is thus reset, the web 10 will have accelerated along that portion of the FIG. 4C waveform depicted by the reference numeral 1. During this interval, GO current has been supplied to motor 30 through the conductor 162 input to OR gate 166, through AND gate 170, power drive amplifier 190, and conductors 192 and 194 in the direction indicated by the arrows 196 and 198. However, as the web reaches the maximum speed of high speed slew, and as flip-flop 160 is reset, GO current is withdrawn from motor 30 since there is no high level signal to any of the inputs to OR gate 166. However, as flip-flop 160 is reset, differentiator 270 will cause flip-flop 580 to be set by application of a suitable (low) level signal over conductor 271 which in turn causes a high level signal (due to inversion by AND gate 570) over output conductor 572 of AND gate 570, which in turn sets flip-flop 580. The flip-flop 580 output over conductor 582, and the velocity detector 220 output control signal over conductor 584 (which is coupled to conductor 221) are applied to separate inputs of AND gate 590, and since both inputs are low, a high level output signal over conductor 592 is applied to OR gate 166, AND gate 170 and power driver amplifier 190 and thus allows GO current to be discontinuously applied to motor 30 as the velocity control signal over conductor 584 alternately goes from low level (when the web speed is above maximum skip speed) to high level (when the web speed is below the maximum skip speed). This function is implemented in a manner similar to the way in which the GO current is supplied at the standard skip speed by velocity detector 222, flip-flop 310, and AND gate 320. The average velocity at the second higher speed, or high speed slew is shown in the velocity waveform of FIG. 4C by the reference numeral 2.

Flip-flop 580 will remain set until it is determined that a stop code is present a predetermined number of lines from the last shift register stage. For the FIG. 3 register, decoder 520, upon decoding a stop code, will determine that four (4) lines of movement remain, at which time flip-flop 580 will be reset over conductor 601 by a high level signal from OR gate 600 through conductor 594 (from single stage decoder 520 through conductor 524). As flip-flop 580 is reset, GO current is no longer supplied to motor 30 through AND gate 590. Simultaneously with the resetting of flip-flop 580, flip-flop 610 is set by a high level signal over conductor 524, which is coupled to its set input. As flip-flop 610 is set, a set output signal at a high level is applied to OR gate 370 over conductor 366 (by way of output conductor 612 from flip-flop 610) causing stop current to be applied to motor 30 through the OR gate 370, AND gate 380, and power driver amplifier 390 in the direction depicted by arrows 392 and 394 in a manner hereinbefore described. Stop current so applied will cause motor 30 and web 10 to decelerate (as shown by reference numeral 3 in velocity waveform FIG. 4C) until velocity detector 222 detects the first speed or standard skip speed. Upon such an occurrence, flip-flop 610 is reset by a suitable high level control signal applied to OR gate 640 over input conductor 243 which is coupled to velocity detector circuit 222 by way of conductor 242. The output of OR gate 640 is coupled to the reset input of flip-flop 610 by means of conductor 642. It should also be noted that flip-flop 580 may be reset over either input conductor 366, or input conductor 506. By so resetting flip-flop 580 over conductor 506, flip-flop 580 remains reset when there is no stop code in register 470 (since then there is no high level input to OR gate 500, and the low level output over conductor 502 is inverted by inverter 490, resulting in a high level signal to OR gate 600 over conductor 506).

As flip-flop 610 is reset, flip-flop 310 is set in the following manner. The resetting of flip-flop 610 is sensed over conductor 612 by differentiator circuit 620 which causes a low level output pulse over conductor 622. Conductor 622 is applied to one input of AND gate 630, and another input to AND gate 630 is received over conductor 624 from conductor 246. Coincidence results in a high level output signal (due to inversion by AND gate 630) over conductor 292, which causes flip-flop 310 to be set by the path through OR gate 290 and conductor 296. As flip-flop 310 is set, a high level signal over conductor 312 effects a GO signal in the same manner as hereinbefore described, and the velocity waveform in FIG. 4C for this interval (controlled by velocity detector 222) is shown by reference numeral 4. The remainder of the cycle shown in FIG. 4C is the same as is shown in FIG. 4A, and the operation is similar to that hereinbefore described.

In addition to the various control signals provided by the control circuitry of FIG. 3, the circuit means shown in FIG. 2 may also provide various control functions for the GO and STOP currents passed to motor 30. As shown in FIG. 2, the retriggerable delay flip-flops RDF 178 and RDF 384 may be operable to prevent the GO or STOP currents from remaining on continuously for more than a predetermined time to enhance the operation of the velocity feedback circuit. Thus RDF 178 may be normally operable to provide a high level signal over conductor 182 when a low level input is received over conductor 176, and may be further operable to provide a high level output for a predetermined time after receipt of a high level input, after which RDF 178 provides a low level output to cut-off the output from AND gate 170. Likewise, RDF 378 is similarly operable to cut-off AND gate 380.

Furthermore, delay circuits 177 and 386 are operable to prevent the GO and STOP currents from ever being on simultaneously. By way of example, when the inputs to circuits 177 and 386 are at a low level, the outputs are normally high. Thus, when there is no STOP current over conductor 372, delay circuit 386 has a high level output over conductor 184 to condition AND gate 170 for receipt of other high level inputs, and when there is no GO current over conductor 172, delay circuit 177 has a high level output over conductor 388 to condition AND gate 380 for receipt of other high level inputs. However when the inputs to delay circuits 177 and 386 are at a high level, the outputs will go to a low level for the duration of the high level input and for a predetermined time thereafter, thus insuring that one of the respective AND gates 170 and 380 will be cut-off. By way of example, a high output over conductor 172 provides GO current, but also causes delay circuit 177 to generate a low level output over conductor 388 to AND gate 380, insuring that no STOP current will be generated while GO current is supplied. Likewise, a high output over conductor 372 provides STOP current, but also causes delay circuit 386 to generate a low level output over conductor 184 to AND gate 170, insuring that no GO current will be generated while STOP current is supplied.

While only certain features and advantages of my invention have been fully described and illustrated, it should be obvious to those skilled in the art that various modifications and alterations may be made therein, without departing from the true spirit and scope of my invention. By way of example, the system may be made to be compatible with a variable stop code issued by a processor (such as a computer) and applied over conductor 532. Toward this end, each of the circuits 492, 494, 496 and 498 may be replaced by comparators and each comparator may also receive a stop code (by way of an electrical connection to conductor 532) to compare the stop code to the shift register contents. If the stop code and the shift register contents compare equally, each comparator would issue a high level signal which would be applied to OR gate 500, and the system would operate as hereinbefore described. Therefore, it is the intention to be limited only by the scope of the appended claims.

What I claim as my invention is:

1. A control circuit for a web driving system having drive means for advancing said web at a first speed, and at a second higher speed, said control circuit comprising: storage means having a plurality of storage stages and input means for receiving groups of coded signals, each storage stage being adapted to store a group of said signals; means for shifting said groups of coded signals through said storage stages; circuit means having an input coupled to predetermined ones of said storage stages for receiving and decoding each group of coded signals stored therein, and for generating a control signal in response to absence of a predetermined coded group signifying the stopping of said web, and means connected to said drive means for causing advancement of said web at said second higher speed upon receipt of said control signal.

2. The invention defined in claim 1 wherein said storage means comprises a plural stage shift register having N storage stages, where N is an integer at least equal to the number of lines required by said drive means to stop said web at said second higher speed.

3. The invention defined in claim 1 and further comprising a timing unit having sensing means for sensing movement of said web and output means, coupled to a shift input of said storage means, for providing timing signals for shifting said coded signals through said storage stages.

4. The invention defined in claim 1 wherein said predetermined ones include all of said storage stages of said storage means.

5. The invention defined in claim 1 and further comprising a comparator having a first input coupled to an output of said storage means for receiving the coded group shifted out of the last storage stage of said storage means, and a second input for receiving said stop code signal, said comparator being operative to generate a stop control signal upon equal comparison of said input signals, and means for passing said stop control signal to said circuit means to halt advancement of said web.

6. In a web driving system having drive means including a drive member for advancing said web at a first speed and at a second higher speed, a control circuit comprising: storage means having a plurality of storage stages and input means for receiving groups of coded signals, each storage stage having means for storing a group of said coded signals; means for shifting said groups of coded signals through said storage stages; decoding means having an input coupled to a plurality of predetermined ones of said storage stages for decoding each group of coded signals therein, and for generating a control signal in response to presence of a skip code at each of said predetermined stages; and circuit means connected to said drive means and said decoding means for causing advancement of said web at said second higher speed upon receipt of said control signal.

7. The invention defined in claim 6 wherein said decoding means includes a plurality of individual decoders, each of which has an individual input connected to an individual output of one of said storage stages.

8. A control circuit for a web driving system having drive means for advancing said web at a first speed, and at a second higher speed, said control circuit comprising: storage means having a plurality of storage stages and input means for receiving groups of coded signals, each storage stage having means for storing a group of said coded signals; means for shifting said groups of coded signals through said storage stages; first decoding means having a plurality of decoding stages, each decoding stage being coupled to a storage stage, and first decoding means being operative to generate a first control signal in response to absence of a stop code in said coupled storage stages; second decoding means coupled to a predetermined storage stage at least $N-1$ stages ahead of the last storage stage of said storage means, where N is an integer at least equal to the number of lines required to halt said web advancing at said second speed, said second decoding means generating a second control signal in response to decoding of a stop code; and circuit means coupled to said first and second decoding means and to said drive means for causing advancement of said web at said second speed upon receipt of said first control signal and for causing advancement of said web at said first speed upon receipt of said second control signal.

9. The invention defined in claim 8 wherein said circuit means causes deceleration of web speed from said second speed to said first speed in response to receipt of said second control signal after receipt of said first control signal.

10. The invention defined in claim 8 and further comprising comparator means having a first input coupled to an output of said storage means for receiving the coded group shifted out of said storage means, and having a second input for receiving said stop code signal, and responsive to correspondence of said coded group and said stop code to generate a third control signal; said circuit means being responsive to said third control signal to halt movement of said web.

11. A control circuit for a web driving system having drive means for advancing said web at a first speed, and at a second higher speed, said control circuit comprising: storage means having a plurality of storage stages and input means for receiving groups of coded signals, each stage being adapted to store a group of said signals; means for shifting said groups of coded signals through said storage stages; decoding means having an input coupled to a predetermined storage stage at least $N-1$ stages ahead of the last storage stage means, where N is an integer at least equal to the number of lines required to halt said web at said second speed, said decoding means generating a control signal in response to decoding of a stop code signal; and circuit means coupled to said drive means and said decoding means for causing advancement of said web at said first speed upon receipt of said control signal.

12. In a web driving system having drive means for advancing a web at a first speed and at a second higher speed, and means for halting said web, the improvement comprising: a format control unit for advancing a format record having a format group thereon and including means for converting said format group codes to coded groups of electrical signals; circuit means having input means for receiving input command signals signifying advancement of said web; a control circuit including storage means having a plurality of storage stages, for receiving said coded groups of electrical signals, each storage stage being adapted to store a group of said signals, means for shifting said groups of coded signals through said storage stages, and decoding means having input means coupled to at least one of said storage stages for decoding the coded group stored therein and for generating a first control signal signifying presence of a stop code and for generating a second control signal signifying absence of a stop code, said circuit means being coupled to said decoding means and said drive means for causing advancement of said web at said first speed upon receipt of said first control signal and for causing advancement of said web at said second speed upon receipt of said second control signal.

13. The invention defined in claim 12 wherein said circuit means includes a velocity feedback circuit having sensing means for sensing web speed and a velocity detector circuit coupled to said sensing means for providing a first velocity control signal in response to sensing web speed above first speed and means for supplying a GO signal to said drive means upon coincidence of said second control signal and said velocity control signal, and for removing said GO signal upon coincidence of said second control signal and said first velocity control signal, for causing said web speed to average said first speed.

14. The invention defined in claim 12 wherein said circuit means includes a velocity feedback circuit having sensing means for sensing web speed and a high speed slew velocity detector circuit coupled to said sensing means for providing a second velocity control signal in response to sensing web speed below second speed, and means for supplying a GO signal to said drive means upon coincidence of said second control signal and said velocity control signal, and for removing said GO signal upon coincidence of said second control signal and said first velocity control signal, for causing said web to average said second speed

References Cited

UNITED STATES PATENTS

| | | | |
|---|---|---|---|
| 3,094,261 | 6/1963 | Thompson | 226—9 |
| 3,174,610 | 3/1965 | Barbagallo et al. | 226—9X |
| 3,176,819 | 4/1965 | Bloom, et al. | 226—9X |

ALLEN N. KNOWLES, Primary Examiner

U.S. Cl. X.R.

226—178